(12) United States Patent
Chandrakasan et al.

(10) Patent No.: US 11,070,362 B2
(45) Date of Patent: Jul. 20, 2021

(54) SYSTEMS AND METHODS FOR PROVIDING SECURE COMMUNICATIONS USING A PROTOCOL ENGINE

(71) Applicant: Massachusetts Institute of Technology, Cambridge, MA (US)

(72) Inventors: Anantha Chandrakasan, Belmont, MA (US); Chiraag Juvekar, Cambridge, MA (US); Utsav Banerjee, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 276 days.

(21) Appl. No.: 16/273,813

(22) Filed: Feb. 12, 2019

(65) Prior Publication Data
US 2019/0253396 A1 Aug. 15, 2019

Related U.S. Application Data

(60) Provisional application No. 62/629,527, filed on Feb. 12, 2018.

(51) Int. Cl.
*H04L 9/06* (2006.01)
*H04L 29/06* (2006.01)
(Continued)

(52) U.S. Cl.
CPC .......... *H04L 9/0643* (2013.01); *G06F 21/602* (2013.01); *H04L 9/0816* (2013.01); *H04L 9/3239* (2013.01); *H04L 9/3268* (2013.01); *H04L 63/0428* (2013.01); *H04L 63/0823* (2013.01)

(58) Field of Classification Search
CPC .................................................... H04L 9/0643
See application file for complete search history.

(56) References Cited

U.S. PATENT DOCUMENTS

2003/0020621 A1* 1/2003 Kessler ................. H04L 63/164
340/635
2007/0143629 A1* 6/2007 Hardjono ............ H04L 63/0823
713/189

(Continued)

OTHER PUBLICATIONS

[No Author Listed] ARM Holdings, Arm Cortex-M Series Processors [Online] <https://developer.arm.com/products/processors/cortex-m>, 7 Pages retrieved Feb. 26, 2020, (2013).

(Continued)

*Primary Examiner* — Bradley W Holder
(74) *Attorney, Agent, or Firm* — Nutter McClennen & Fish LLP

(57) ABSTRACT

Systems and methods for implementing confidential communications between nodes of a network provide reduced power consumption, require less memory, and provide improved security, relative to previously-known systems and method. Preferred embodiments implement protocol functions in hardware, as opposed to software, to yield some or all of the foregoing improvements. Some embodiments use a hashing circuit for multiple purposes, while maintaining its ability to compute successive intermediate hash values. Some embodiments improve security of systems using circuits configured to leverage a favorable data format.

23 Claims, 13 Drawing Sheets

(51) Int. Cl.
H04L 9/08 (2006.01)
H04L 9/32 (2006.01)
G06F 21/60 (2013.01)

(56) References Cited

U.S. PATENT DOCUMENTS

| | | | |
|---|---|---|---|
| 2013/0046993 | A1 | 2/2013 | Jueneman et al. |
| 2015/0032946 | A1 | 1/2015 | Goss et al. |
| 2015/0222637 | A1* | 8/2015 | Hung ............... H04L 63/20 726/1 |
| 2016/0203522 | A1* | 7/2016 | Shiffert ............ G06Q 30/0267 705/14.58 |

OTHER PUBLICATIONS

[No Author Listed] ARM Holdings, Arm mbedTLS [Online] <https://tls.mbed.org/>, 1 Page, retrieved Feb. 26, 2020 (2016).
[No Author Listed] National Institute of Standards and Technology (NIST), "Advanced Encryption Standard (AES)," Federal Information Processing Standards Publication 197, 51 Pages (Nov. 26, 2001).
[No Author Listed] National Institute of Standards and Technology, "Secure Hash Standard (SHS)," Federal Information Processing Standards Publication 180-4, 39 Pages (Aug. 2015).
[No Author Listed] "SD Specifications Part 1 Physical Layer Simplified Specification Version 6.00," SD Card Associations, 263 Pages (Apr. 10, 2017).
Banerjee et al., "An Energy-Efficient Reconfigurable DTLS Cryptographic Engine for End-to-End Security in IoT Applications," IEEE Int. Solid-State Circuits Conf. (ISSCC) Dig. Tech. Papers, pp. 42-44 (Feb. 2018).
Banerjee et al., "An Energy-Efficient Reconfigurable DTLS Cryptographic Engine for Securing Internet-of-Things Applications," in Institute of Electrical and Electronics Engineers Journal of Solid-State Circuits, vol. 54, No. 8, pp. 2339-2352 (Aug. 2019).
Banerjee et al., "eeDTLS: Energy-Efficent Datagram Transport Layer Security for the Internet of Things," 6 Pages, Institute of Electrical and Electronics Engineers (2017).
Banerjee, "Energy-Efficient Protocols and Hardware Architecture for Transport Layer Security," Department of Electrical Engineering and Computer Science Massachusetts Institute of Technology, 104 Pages (Jun. 2017).
Barker et al., "Recommendation for Random Number Generation Using Deterministic Random Bit Generators," National Institute of Standards and Technology Special Publication 800-90A Revision 1, 110 Pages (Jun. 2015).
Canright, "A Very Compact Rijndael S-Box," Naval Postgraduate School, 71 Pages (May 17, 2005).
Duran et al., "A System-on-Chip Platform for the Internet of Things featuring a 32-bit RISC-V based Microcontroller," Design Group of Intergrated Systems ONCHIP, Universidad Industrial de Santander, 4 Pages (Feb. 2017).
Dworkin, "Recommendation for Block Cipher Modes of Operation: Galois/Counter Mode (GCM) and GMAC," National Institute of Standards and Technology, NIST Special Publication 800-38D (Nov. 2007).
Fan et al., "State-of-the-art of secure ECC implementations: a survey on known side-channel attacks and countermeasures," International Symposium on Hardware-Oriented Security and Trust (HOST), Institute of Electrical and Electronics Engineers, pp. 76-86 (2010).

Guajardo et al., "Efficient Hardware Implantation of Finite Fields with Applications to Cryptography," Acta Appl Math, vol. 93, pp. 75-118 (Sep. 26, 2006).
Hamalainen et al., "Design and Implementation of Low-area and Low-power AES Encryption Hardware Core," IEEE, Proceedings of the 9th EUROMICRO Conference on Digital System Design, Institute of Electrical and Electronics Engineers, 7 Pages (2006).
Hedabou et al., "Countermeasures for Preventing Comb Method Against SCA Attacks," ISPEC 2005, LNCS 3439, pp. 85-96 (2005).
Hutter et al., "A Cryptographic Processor for Low-Resource Devices: Canning ECDSA and AES Like Sardines," WISTP 2011, LNCS 6633, International Federation for Information Processing, pp. 144-159 (2011).
Hutter et al., "NaCI's Crypto_box in Hardware," International Association for Cryptologic Research, CHES 2015, LNCS 9293, pp. 81-101 (2015).
Keoh et al., "Securing the Internet of Things: A Standardization Perspective," IEEE Internet of Things Journal, vol. 1, No. 3, pp. 265-275 (Jun. 2014).
Mathew et al., "53 Gbps Native GF (24)2 Composite-Field AES Encrypt/Decrypt Accelerator for Content-Protection in 45 nm High-Performance Microprocessors," Institute of Electrical and Electronics Engineers Journal of Solid-State Circuits, vol. 46, No. 4, pp. 767-776 (Apr. 2011).
Mathew et al., "340 mV-1.1 V, 289 Gbps/W, 2090-Gate NanoAES Hardware Accelerator with Area-Optimized Encrypt/Decrypt GF(24)2 Polynomials in 22 nm Tri-Gate CMOS," Institute of Electrical and Electronics Engineers Journal of Solid-State Circuits, vol. 50, No. 4, pp. 1048-1058 (Apr. 2015).
Meyer et al., "Lessons Learned From Previous SSL/TLS Attacks a Brief Chronology of Attacks and Weaknesses," Horst Gortz Institute for IT-Security, Ruhr-University Bochum, 15 Pages, (2013).
Pessl et al., "Curved Tags—A Low-Resource ECDSA Implementation Tailored for RFID," N. Saxena and A.-R. Sadeghi (Eds.): RFIDSec 2014, LNCS 8651, pp. 156-172 (2014).
Pornin, "Deterministic Usage of the Digital Signature Algorithm (DSA) and Elliptic Curve Digital Signature Algorithm (ECDSA)," ISSN: 2070-1721, 79 Pages (Aug. 2013).
Rescorla et al, "Datagram Transport Layer Security Version 1.2," Internet Engineering Task Force (IETF), ISSN: 2070-1721, 32 Pages (Jan. 2012).
Rescrola et al., "The Datagram Transport Layer Security (DTLS) Protocol Version 1.3," 41 Pages (Nov. 29, 2017).
Rescrola, "The Transport Layer Security (TLS) Protocol Version 1.3," Internet Engineering Task Force (IETF), ISSN: 2070-1721, pp. 160 (Aug. 2018).
Roy et al., "Designing Tiny ECC Processor," 17th Workshop on Elliptic Curve Cryptography, ESAT/COSIC and iMinds, KU Leuven, 90 Pages (Publication Date Unknown).
Uytterhoeven et al., "A sub 10pJ/Cycle Over a 2 to 200 MHz Performance Range RISC-V Microprocessor in 28 nm FDSOI," IEEE European Solid State Circuits Conference (ESSCIRC), pp. 326-329 (Sep. 2018).
Waterman et al., "The RISC-V Instruction Set Manual, vol. I: User-Level ISA, Version 2.0," EECS Department, University of California, Berkeley, Tech. Rep. UCB/EECS-2014-54 (May 2014).
Zhang et al., "A Compact 446 Gbps/W AES Accelerator for Mobile SoC and IoT in 40nm," IEEE Symposium on VLSI Circuits, pp. 1-2 (Jun. 2016).
Zhang et al., "Recryptor: A reconfigurable in-memory cryptographic Cortex-M0 processor for IoT," IEEE Symposium on VLSI Circuits, pp. C264-C265 (Jun. 2017).
International Search Report and Written Opinion for Application No. PCT/US 19/17658, 9 pages, (United States Patent and Trademark Office dated May 1, 2019).

* cited by examiner

SYSTEMS AND METHODS FOR PROVIDING SECURE COMMUNICATIONS USING A PROTOCOL ENGINE

RELATED APPLICATIONS

This application claims priority to U.S. Provisional Application No. 62/629,527, filed Feb. 12, 2018, titled "Systems and Methods for Providing Secure Communications Using a Protocol Engine" and naming Anantha Chandrakasan, Chiraag Juvekar, and Utsav Banerjee as inventors The disclosure of the foregoing application is incorporated herein, in its entirety, by reference.

TECHNICAL FIELD

The present disclosure relates to encryption, and, more particularly, to systems and method for encrypted communication.

BACKGROUND ART

It is known in the art to establish communications between nodes on a network by using a handshake to establish a communication channel between the nodes. It is also know to encrypt messages at a sending node prior to sending the messages across the network, and to decrypt those messages upon arrival at a receiving node.

Many handshake protocols and many encryption protocols are known in the art. Such protocols are typically performed by a microprocessor at a sending or receiving node, in which the microprocessor executes instructions stored in a memory at the node. Systems using microprocessors for protocols (e.g., handshake) and/or encryption consume power at rates that are undesirable in some applications. In addition, prior art systems require memory in amounts sufficient to store all messages sent and received during a handshake, for the purpose of generating a hash over all such messages.

Accordingly, there is a need for handshake and encryption protocols that consume less power without compromising their integrity. It may also be desirable for such systems and methods to have reduced memory requirements with respect to the number of messages that are sent and received during a handshake.

Summary of Various Embodiments

In one exemplary embodiment, a client system is configured to provide secure communications between the client and a server on a network. To that end, the client system includes a hashing circuit, a memory circuit, a fixed-logic protocol controller, a cryptographic accelerator, and a communications interface. The fixed-logic protocol controller is in data communication with the hashing circuit and the memory circuit, and is configured to execute a client-side handshake protocol. The cryptographic accelerator is in data communication with the hashing circuit and the fixed-logic protocol controller, and is configured to encrypt outbound messages and to decrypt inbound messages. The communications interface is in operable communication with the network to transmit one or more messages from the client to the server, and to one or more receive messages from the server.

In some embodiments, the hashing circuit can be a fixed-logic hashing circuit, and the cryptographic accelerator can be a fixed-logic cryptographic accelerator. Alternatively, or additionally, the hashing circuit can be a fixed-logic hashing circuit, and the cryptographic accelerator can be a programmable microprocessor.

Some embodiments of the system can also include a programmable microprocessor separate from the fixed-logic protocol controller. Some such embodiments further can include a clock gate configured to controllably disable a clock signal to the programmable microprocessor when the fixed-logic protocol controller is executing a handshake with the server.

In some embodiments, the hashing circuit can be a fixed-logic circuit configured to execute a SHA2-256 hash protocol, and the fixed-logic protocol controller can be configured to:

(a) use the hashing circuit to generate an intermediate hash value;

(b) store state data from the hashing circuit to the memory circuit, the state data representing the state of the hashing circuit at a first time and including at least the intermediate hash value;

(c) use the hashing circuit for a secondary purpose, such secondary purpose leaving the hashing circuit in a second state;

(d) subsequently read the state date from the memory circuit; and (e) restore the hashing circuit to the first state, so that the hashing circuit is configured to generate a subsequent hash value by operating on the intermediate hash value.

In some such embodiments the hashing circuit can be configured to discard a message from the set of messages after using such message to generate an intermediate hash value and prior to generating the subsequent hash value.

the cryptographic accelerator can include a fixed-logic elliptic curve cryptography accelerator, and the circuits of the elliptic curve cryptography accelerator can be configured to operate on data in a zero-less signed digit format.

In another exemplary embodiment, a method of executing a handshake between a client and a server includes generating, at the client, a client hello message, and sending the client hello message to the server. The method also includes creating a first intermediate hash of the client hello message using a SHA2-256 hash circuit, storing the first intermediate hash in the SHA2-256 hash circuit, and discarding or deleting the client hello message at the client. Still further the method includes receiving, at the client, a server hello message from the server. Then, the method uses the SHA2-25 circuit, after discarding or deleting the client hello message at the client, to create a second intermediate hash from the first intermediate hash and the server hello message.

In some embodiments, after using the SHA2-256 circuit to create a second intermediate hash, and before using the SHA2-256 circuit to generate a subsequent hash, the method can including discarding or deleting the server hello message at the client.

In some embodiments, after creating the second intermediate hash, when the SHA2-256 circuit is in a given state, the method can include performing a hash state write to a memory (e.g., a random access memory), the hash state write storing, in the memory, hash state data defining the given state of the SHA2-256 circuit. Further, such a method can include subsequently performing a secondary function using the SHA2-256 circuit, the secondary function being a function other than a hash function and leaving the SHA2-256 circuit in a second state different from the given state. The secondary function may include, for example, generating a client handshake key, or verifying a server certificate received from the server. Such a method can further include subsequently performing a hash state read from the memory, by which the hash state read retrieves, from the memory, the hash state data, and subsequently restoring the SHA2-256 circuit to the given state using the hash state data.

A further exemplary client system for providing secure communications between the client and a server on a network includes a hashing circuit, a memory circuit, a fixed-logic means, a cryptographic accelerator means, and a communications interface. The fixed-logic means is for executing a client-side handshake protocol. The cryptographic accelerator means is for encrypting outbound messages and decrypting inbound messages. The communications interface is in operable communication with the network to transmit one or more messages from the client to the server, and to receive one or more messages from the server.

The hashing circuit can be a fixed-logic hashing circuit, and the cryptographic accelerator means can include a fixed-logic cryptographic accelerator. Alternatively, or additionally, the hashing circuit can be a fixed-logic hashing circuit, and the cryptographic accelerator means can include a programmable microprocessor.

In some embodiments, the client system can include a programmable microprocessor that can be separate from the fixed-logic means for executing the client-side handshake protocol. The hashing circuit can be a fixed-logic circuit that is configured to execute a SHA2-256 hash protocol and the fixed-logic means for executing a client-side handshake protocol can be configured to:

(a) use the hashing circuit to generate an intermediate hash value from a set of messages;

(b) store hash state data from the hashing circuit to the memory circuit, the hash state data representing the state of the hashing circuit at a first time and including at least the intermediate hash value;

(c) subsequently use the hashing circuit for a secondary purpose, such secondary purpose leaving the hashing circuit in a second state;

(d) subsequently read the hash state date from the memory circuit; and (e) subsequently restore the hashing circuit to the first state, so that the hashing circuit is configured to generate a subsequent hash value by operating on the intermediate hash value.

In some such embodiments, the hashing circuit can be further configured to discard or delete a message from the set of messages after using such message to generate an intermediate hash value and prior to generating the subsequent hash value.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
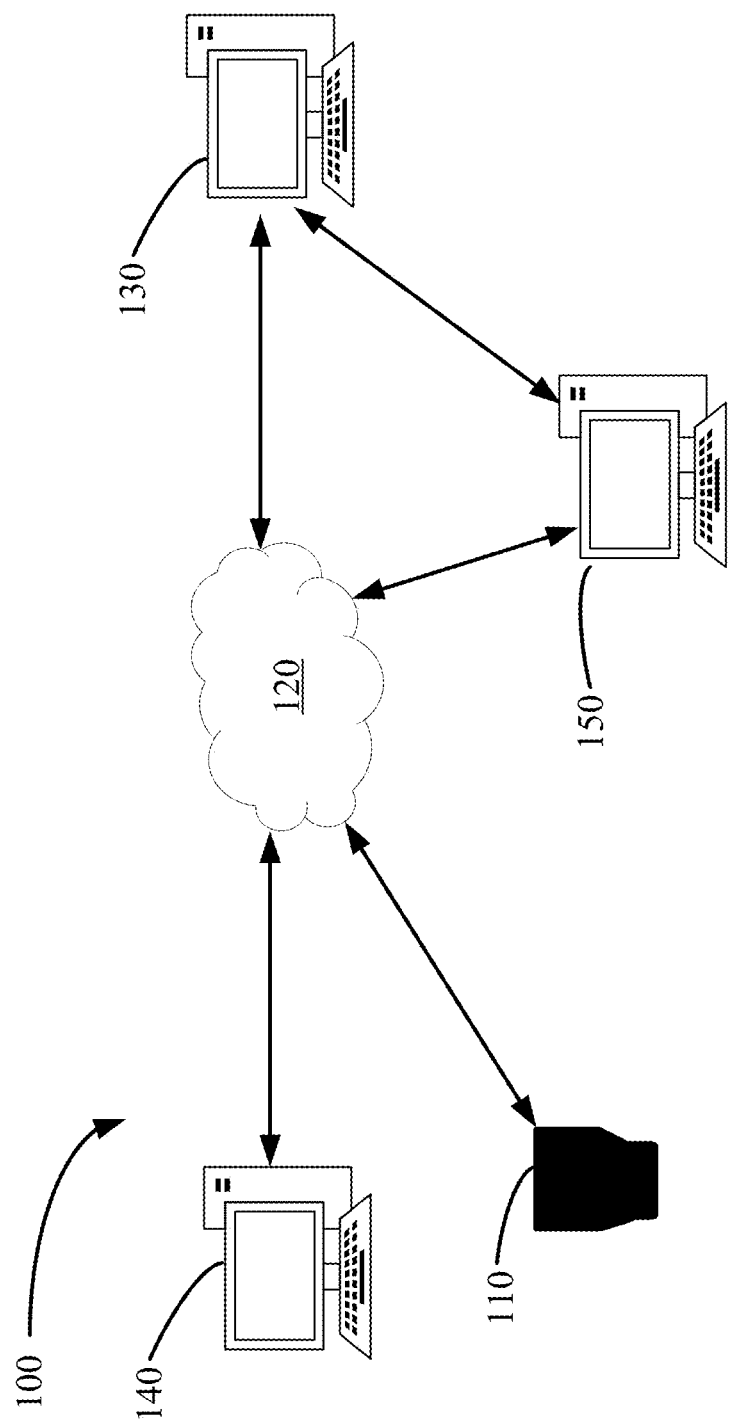
FIG. 1 schematically illustrates a network for carrying secured communications according to illustrative embodiments.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

Illustrative embodiments described herein provide a system having a hardware-accelerated protocol engine. Preferred embodiments produce session transcripts (or session hashes) using a circuit and method that performs a running hash. Unlike prior art methods and systems, such embodiments do not require the circuit to store all previous message sent and received, thus reducing memory requirements and computation cost. Preferred embodiments also increase the security of cryptographic processes by formatting data in a zero-less signed digit form, and processing that data in a circuit specially configured to process data in that format.

Consequently, embodiments described herein provide improvements over prior art cryptographic systems in one or more of the following ways: reducing power consumption, relative to prior art systems, by implementing some functions in hardware, as opposed to prior art software-implemented systems; requiring less memory than prior art systems, due for example to the hashing circuit implementation and (dual-use) operation described below; and/or rendering a cryptographic system more secure against certain types of attacks. At least some embodiments achieve all of the foregoing improvements.

Definitions

A "set" includes at least one member.

A "fixed-logic" circuit is a digital circuit configured to process digital data, and whose function is fixed and unalterable upon circuit fabrication. For example, a micro-coded state machine is one type of fixed logic circuit. In contrast, a programmable computer processor, such as a microprocessor, is not a fixed logic circuit. A microprocessor configured to execute code to encrypt data and/or to implement a communication protocol is not a fixed logic circuit.

The term "hash state data" means data that defines the state of a hashing circuit (e.g., a SHA2-256 circuit) at a given point in a process, at which the hashing circuit is configured to process message data to create a hash value (i.e., an intermediate hash value or a final hash value). Hash state data defines the state of a hashing circuit to a degree that the hashing circuit can be restored to its state the above-mentioned given point in the process. Hash state data may therefore be described as "completely" defining the state of the hashing circuit.

A "hash state write" is an operation in which hash state data from a hashing circuit (e.g., a SHA2-256 circuit) is written to a memory.

A "hash state read" is an operation in which hash state data is read from the memory.

A "hash state restore" (or "hash circuit restore") is an operation in which a hashing circuit is restored from a state to a previous state using hash state data.

Secure Communications

FIG. 1 schematically illustrates a network 100 for carrying secured communications according to illustrative embodiments. The network 100 includes a plurality of interconnected nodes, including a device 110 on the internet of things, a computer 140, a man-in-the middle computer 150, and another computer node 130. In illustrative embodiments, the computer node 130 is a server. The nodes are connected through a network 120 of other nodes, and in some embodiments via the man-in-the middle computer 150, as is known in the art.

Some nodes may be considered to be resource constrained, in terms of available memory at the node, and/or available power at the node. For example, a device on the internet of things may be a sensor constrained by battery power, and/or by limits on its physical size. In illustrative embodiments, device 110 may be such a node. Such devices benefit from reduced memory requirements and/or from reduced power consumption (as compared to known devices) of embodiments described herein.

DTLS Overview

Figure 2:
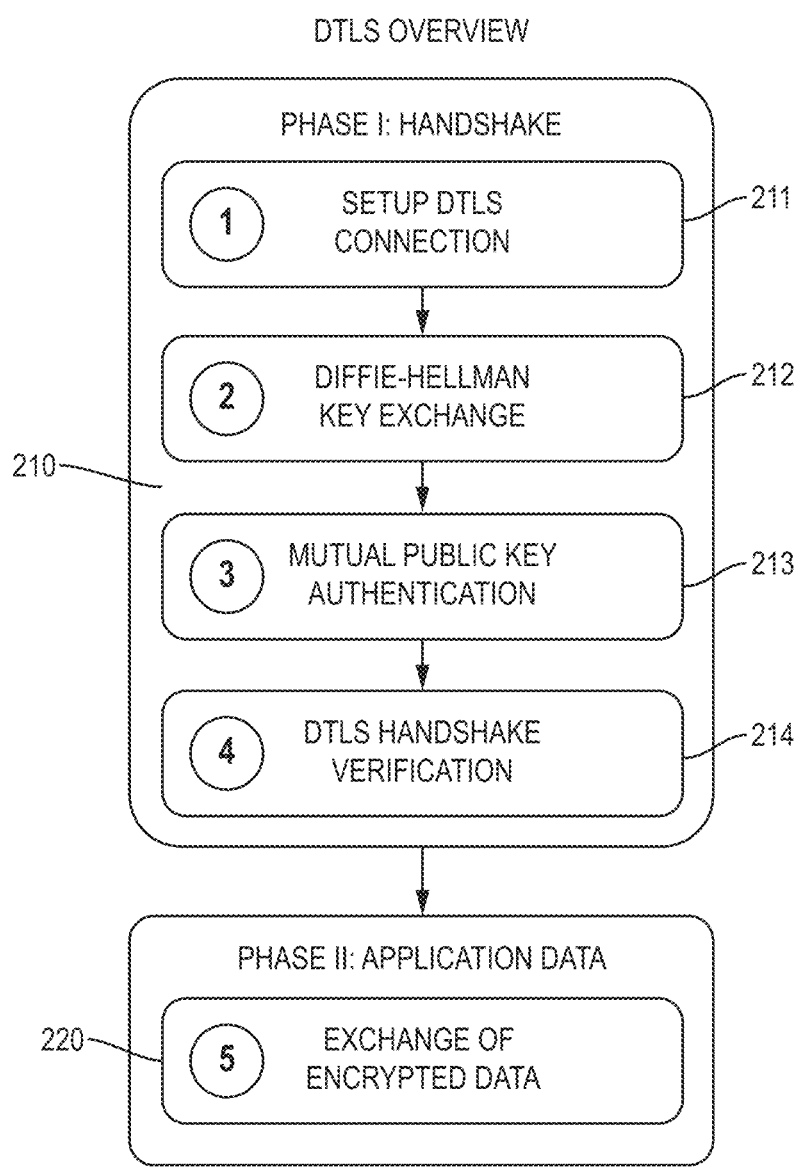
FIG. 2 schematically illustrates an overview of Datagram Transport Layer Security (DTLS) communication.

FIG. 2 summarizes the two major phases of the Datagram Transport Layer Security (DTLS) protocol: the handshake phase 210 and the application data phase 220.

The handshake phase 210 comprises four steps. In the first step 211, the client (edge node) 110 and the server 130 agree upon protocol parameters such as the cryptographic algorithms to be used. Next, a Diffie-Hellman key exchange is performed 212 to establish a shared secret over the untrusted channel. Following this, the client 110 and the server 130 authenticate each other through digital certificate verification 213. Finally, the two parties verify the integrity of the information exchanged in the above steps 214, to prevent man-in-the-middle attacks. At this point, a mutually authenticated confidential channel has been established between the client 110 and the server 130, which channel is then used in the second phase 220 to exchange encrypted application data. Preferred embodiments described herein accelerate one or both phases (handshake 210 and communication 220) of the process in hardware.

DTLS System Overview

Figure 3:
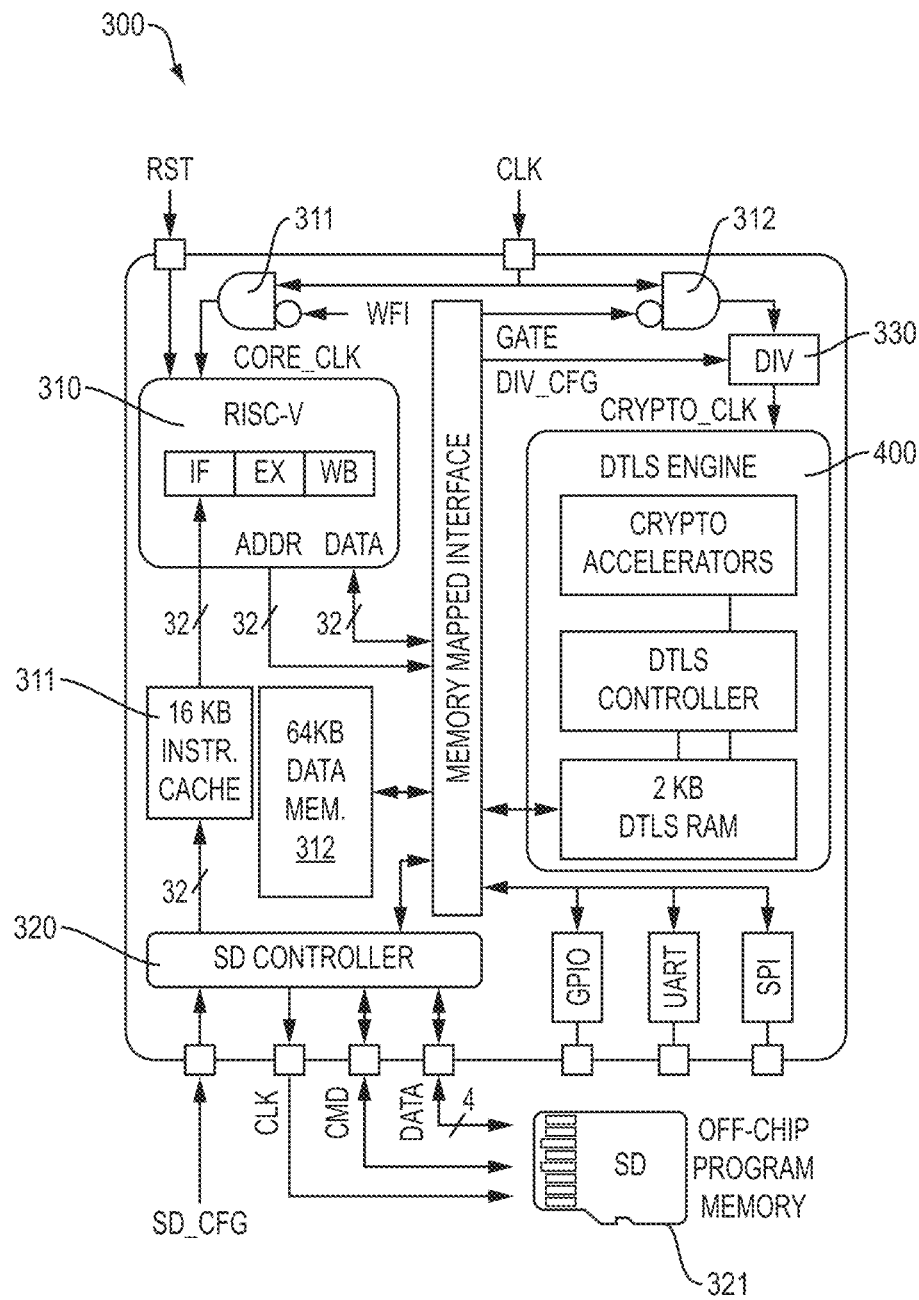
FIG. 3 schematically illustrates a client system according to an illustrative embodiment.

FIG. 3 schematically illustrates a client system 300 according to an illustrative embodiment. The system 300 comprises a 3-stage RISC-V processor 310 supporting the RV32I instruction set, with a 16 KB instruction cache 311 and a 64 KB data memory 312. The processor 310, in preferred embodiments, executed program code to implement functions of the client 110 other than cryptography and communication protocol. For example, if the client 110 is a sensor on the Internet of Things, the processor 310 may interface with the sensor hardware and format (not-yet encrypted) message about sensor operation for transmission to the server 130. As another example, if the client 110 is a device having a device function, the processor 310 may interface with components of the device to control the device's performance of the device function, and format (not-yet encrypted) messages about the device's state or functionality for transmission to the server 130. An SD card 321 is used as the backing store for larger programs, and interfaces to the client system 300 via an SD controller 320.

A memory-mapped DTLS engine (DE) 400 (is described further, below), comprised of a protocol controller 450, a dedicated 2 KB RAM 470, and AES-128 GCM 427, SHA2-256 430 and prime curve elliptic curve cryptography (ECC) 421 primitives, accelerates the encryption and DTLS protocol.

In preferred embodiments, sleep mode is implemented on the RISC-V processor 310, to save power, by gating its clock when cryptographic tasks are delegated to the DTLS engine 400. A clock signal to the RISV-V process 310 is gated by gating circuit 311. The DTLS engine 400 uses a dedicated hardware interrupt 402 to wake the processor 310 on completion of these tasks.

The DTLS engine 400 is clocked by a software-controlled divider 330 to decouple the processor operating frequency from the long critical paths in the ECC accelerator 421. In addition to full verification of the server certificate in the third step 213 of the handshake phase 210, the DTLS engine 400 also supports caching of server certificate information to speed up future handshakes. This cached mode reduces an ECDSA-Verify operation to gain at least approximately 1.56× savings in handshake energy.

DTLS Engine

Figure 4A:
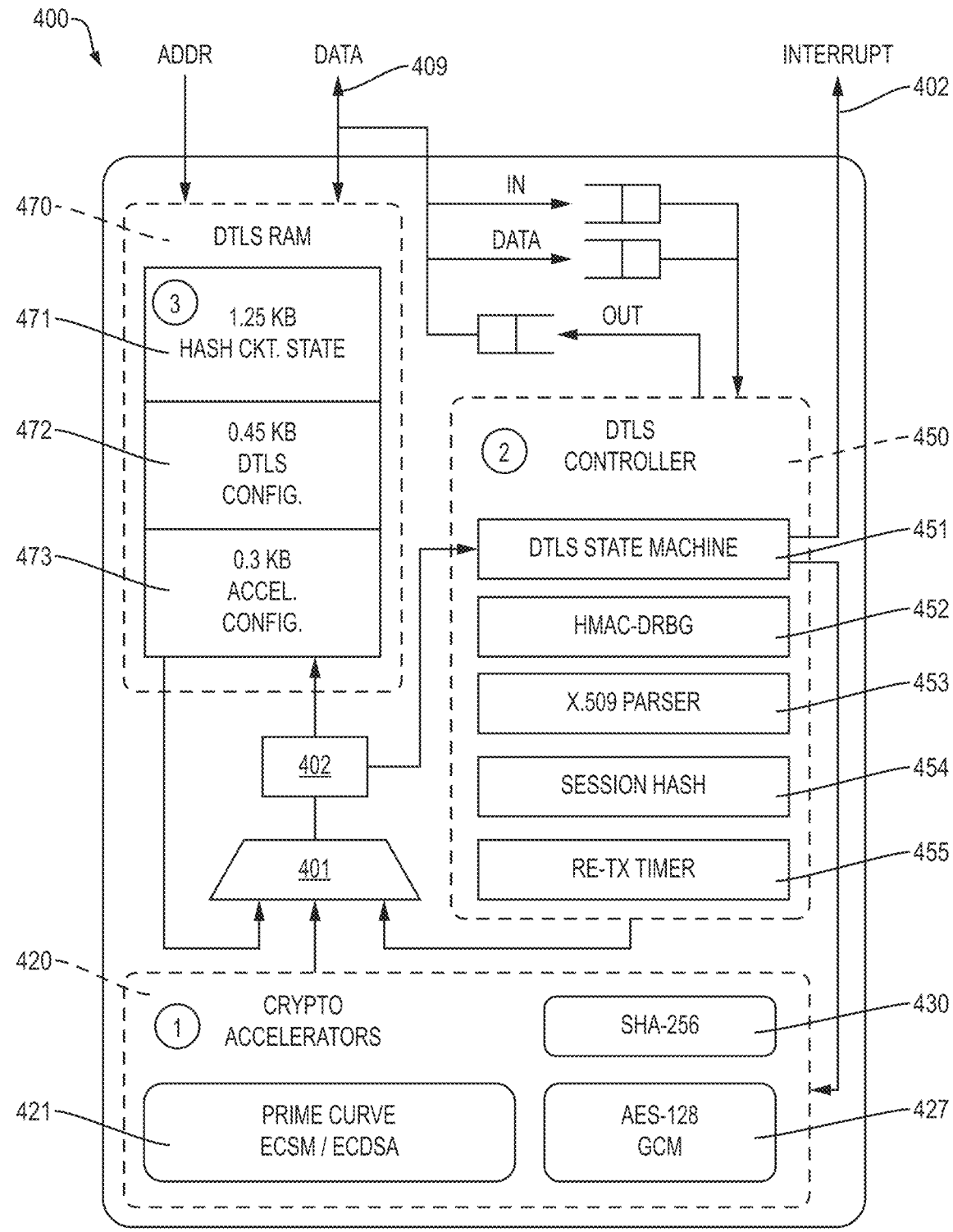
FIG. 4A schematically illustrates an embodiment of a DTLS engine.

FIG. 4A schematically illustrates an embodiment of a DTLS engine 400. In preferred embodiments, the DTLS engine 400 is a fixed-logic circuit.

As described in more detail below, preferred embodiments of the DTLS engine 400 includes a hashing circuit 430 (which may be considered to be a part of either the cryptography accelerator 420 or the DTLS controller 450), a memory circuit 470, which memory is independent of the SHA2-256 circuit (and which may be a random access memory), and a fixed-logic protocol controller 450 in data communication with the hashing circuit 430 and the memory circuit 470. The fixed-logic protocol controller 450 is configured to execute a client-side handshake protocol. The DTLS engine 400 also includes a cryptographic accelerator 420 in data communication with the hashing circuit 430 and the fixed-logic protocol controller 450. The cryptographic accelerator is configured to encrypt outbound messages (e.g., from the client 110 to the server 130) and to decrypt inbound messages (e.g., from the server 130 to the client). The DTLS engine also includes a communications interface 409 in operable communication with the network 120 to transmit message from the client 110 to the server 130, and to receive message from the server 130. In preferred embodiments, the cryptographic accelerator 420 is a fixed-logic circuit, but in other embodiments may be a microprocessor configured to execute instruction code to implement the functions described herein.

The cryptography circuit 420 includes several sub-circuits, including an ECC accelerator (which may be referred-to as "Prime Curve generator circuit") 421, an AES-128 GCM circuit 427, and a hash circuit 430. In preferred embodiments, the hash circuit 430 is configured to implement a SHA2-256 hash function.

In addition to its use in the cryptography function of the cryptography circuit 420, preferred embodiments also use the hash circuit 430 to perform portions of the handshake function in concert with the DTLS controller 450. An illustrative embodiment is described in connection with FIG. 5 and FIG. 6. For example, the handshake function requires, at some points, calculation (by the hash circuit 430) of a session transcript of all messages sent and received prior to such points (i.e., message sent "to date"). Specifically, the DTLS handshake protocol requires calculation of transcripts at a plurality of pre-defined points, respectively. As another example, the hash circuit 430 also performs some or all of other secondary functions (e.g., functions that do not compute an intermediate hash value or final hash value of a session hash), such as computing a key, verifying certificates, to name but a few examples.

The DTLS controller 450 can include several circuits, each of which in preferred embodiments is a fixed-logic circuit.

The DTLS State Machine 451 controls the generation, transmission, reception and processing (e.g., verification) of protocol messages, along with the associated cryptographic computations.

The HMAC-DRBG circuit 452 uses the SHA2-256 cryptographic accelerator 430 to generate deterministically random numbers following the NIST DRBG specification.

The X.509 Parser circuit 453 parses <Server Certificate> in standard X.509 format and extracts information relevant to the handshake, such as server name, server public key and certificate authority signature.

The Session Hash circuit 454 controls the hash state write 481, hash state read 483, and hash state restore 484 operations described in connection with FIG. 4D. In preferred embodiments, the Session Hash circuit 454 is configured to control the save and restore of SHA2-256 hash state to and from DTLS RAM; contains the 512-bit FIFO 434, described below, to feed handshake message bytes (to be hashed into the session transcript). In illustrative embodiments, the hash state is updated whenever the FIFO is full (that is, a full 512-bit SHA2-256 input block is available); any residual bits in the FIFO are also saved to DTLS RAM 470 when saving the hash state.

The Re-TX Timer circuit 455 contains a hardware timer to control the re-transmission of client-side handshake messages to the server if the expected server response has not been received. In preferred embodiments, all other components of the DTLS engine 450 are clock-gated by DTLS clock gate circuit 312 during the time when it is waiting for a server response.

Figure 4B:
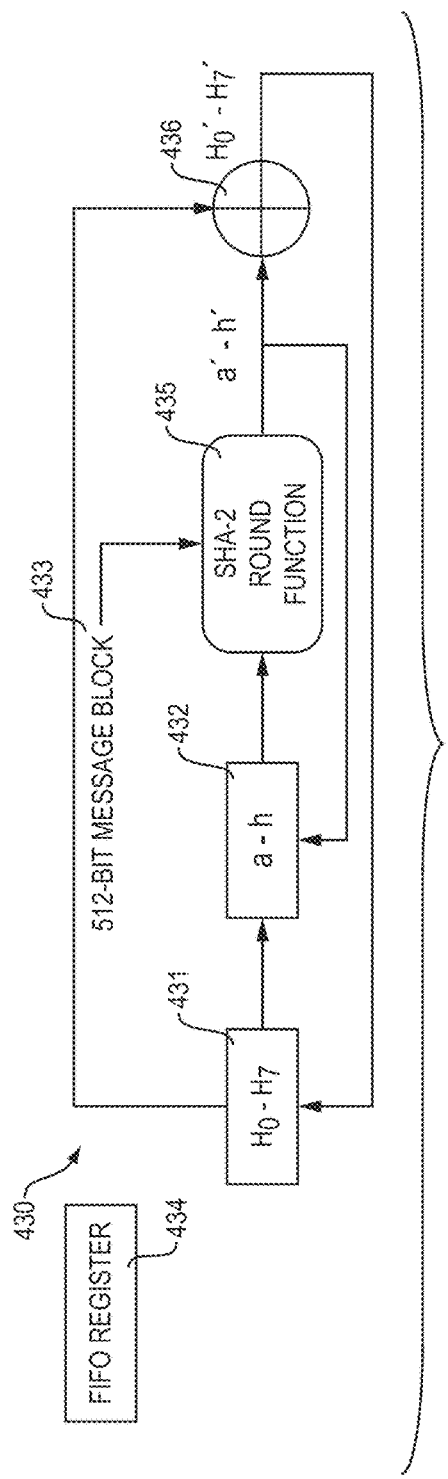
FIG. 4B schematically illustrates an embodiment of a SHA2-256 circuit.
Figure 4C:
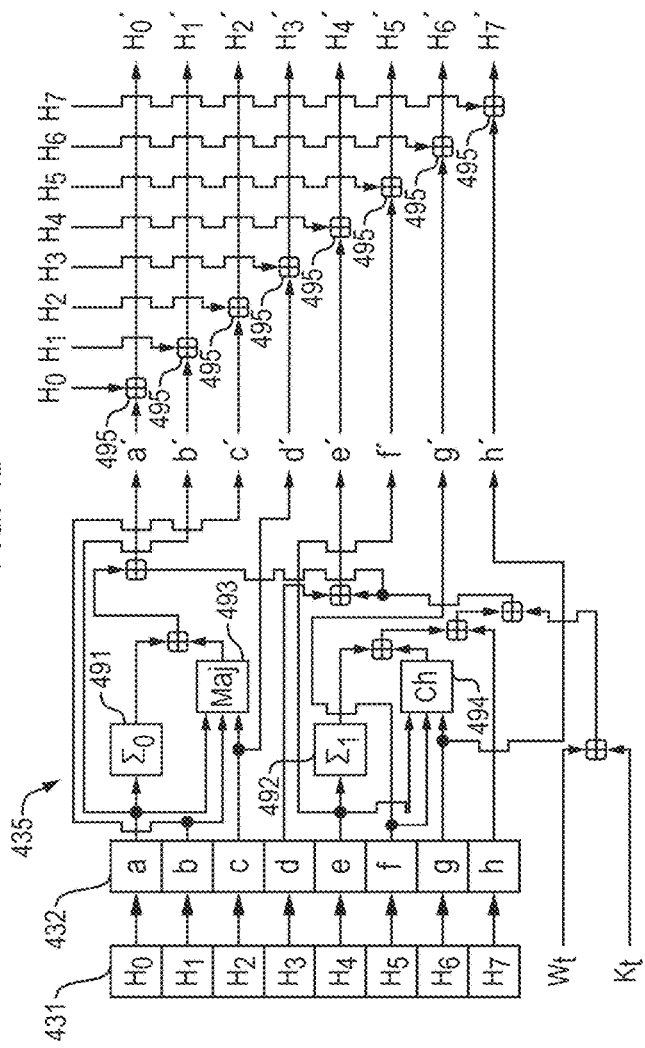
FIG. 4C schematically illustrates an embodiment of a round function circuit.
Figure 4D:
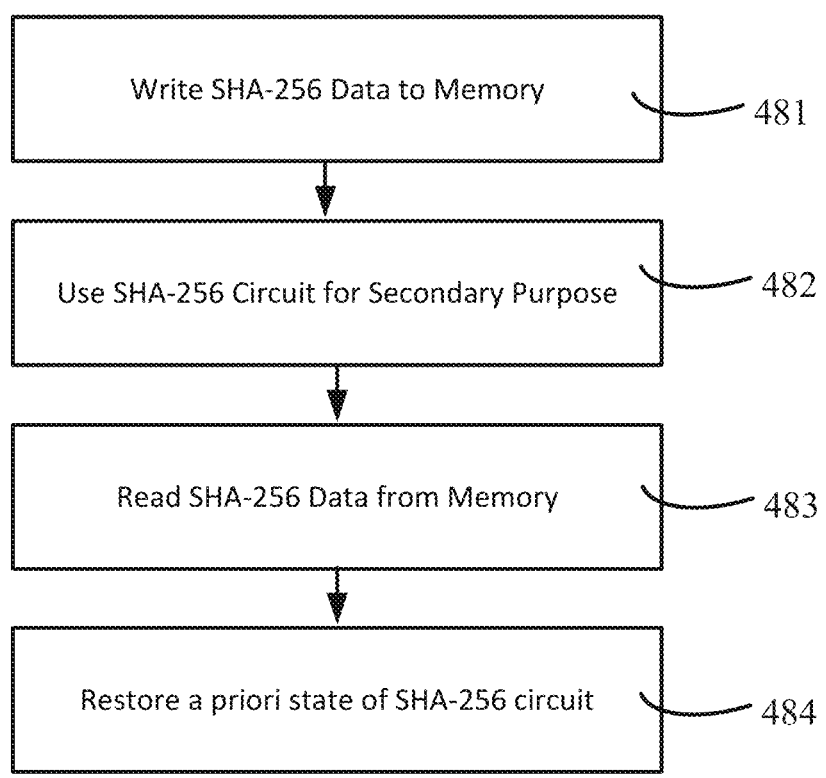
FIG. 4D is a flow chart illustrating an embodiment of save and restore operation of a SHA2-256 circuit.

FIG. 4B schematically illustrates an embodiment of a SHA2-256 circuit 430. FIG. 4C schematically illustrates an embodiment of a round function circuit 435. The SHA2-256 circuit 430 is described below, using a DTLS handshake for illustrative purposes.

The DTLS handshake involves a plurality of session hash (transcript) computations, that is, SHA2-256 hash of the concatenation of all messages exchanged till that point in the handshake.

Software implementations of DTLS historically save all the handshake messages and, at each of the plurality of points at which a session hash transcript is specified, compute the hash over all of the messages up to that point. That approach is undesirable, however, in part because it requires all messages to-date to be stored, which in turn requires a sufficient amount of memory, and energy to operate that memory, to operate properly. In addition to being undesirable, those requirements may be unattainable, in some applications, such as sensors or other devices connected to the Internet of Things.

Further, such an approach is undesirably expensive in that it requires, each time a session is computed, that the hash be computed using saved versions of all messages to-date. Handshakes can be as large as 3-4 KB and repeatedly reading them from SRAMs can be very expensive.

Preferred embodiments improve on prior technology by exploiting a special property of the SHA2-256 hash function which is a property that not all hash functions have. More specifically, in a SHA2-256 hash computation, the value of an intermediate hash defines the state of the hash computation at the stage at which the intermediate hash value is computed, and subsequent hash computations (whether intermediate hash value computations or final hash value computations) can be performed starting with such intermediate hash value, rather than (as in prior art hash computations) having to use as inputs to the hash computation saved copies of all messages that have previously been hashed. The inventors realized that they could develop and implement a running hash implementation in hardware for computing DTLS session transcripts, and thereby reduce memory usage and computation time and energy. As described below, preferred embodiments do not require that all messages to-date be stored in order to compute hash transcripts, and do not require a hashing operation to consume saved copies of all messages to-date. Moreover, preferred embodiments discard each handshake message after such message (i.e., or the bytes of such message) has been used in a hash function, and before computing a subsequent session transcript.

In operation, the input messages are initially, and temporarily, stored in a FIFO register 434, and digested in blocks of 512 bits each, requiring 64 iterations of the round function per block. The internal state registers H0-H7 431 are initialized with values as per the SHA2-256 specification. For each iteration, the state H0-H7 is copied into registers a-h 432, which is then provided as input to the round function circuit 435 along with the message block 433.

An embodiment of a round function circuit 435 is schematically illustrated in FIG. 4C. The internal state comprises 16 32-bit registers 431 (H0-H7) and a-h (432). The $\Sigma_0$ (491), $\Sigma_1$ (492), Maj (493) and Ch (494) functions are specified in "Secure Hash Standard (SHS)", NIST Technical Report, FIPS PUB 180-4, March 2012, while + (+ in a square) 495 denotes 32-bit addition modulo $2^{32}$, that is, the final carry is ignored. H0'-H7' and a'-h' denote the updated state values after one iteration. Although the state of the hash function is defined by H0-H7, a-h and the message schedule, it is important to note that the data in the registers of the SHA2-256 circuit 430 completely define the SHA2-256 state after every 64 iterations of the round, that is, after every 512-bit block has been processed. This property can be exploited to implement efficient running hashes, as will be discussed herein.

The critical paths in the round function were implemented using a combination of carry-save and ripple-carry adders to reduce latency. The SHA2-256 core computes a'-h' in parallel to achieve increased energy-efficiency. When implemented in silicon, the inventors found that this embodiments takes 65 cycles to process a 512-bit input block, while consuming 4.43 pJ/bit at 0.8 V.

The output of the round function circuit 435 is a'-h', which acts as the updated value for registers a-h 432 for the next iteration. To that end, the values a'-h' are written to register a-h 432.

The values a'-h' and H0-H7 (from registers 431) are also XOR-ed together through exclusive-or (XOR) circuit 436 to generate the intermediate hash value H0'-H7' which is stored in, and subsequently used as the updated value for, registers H0-H7 431 for the next iteration.

When computing the SHA2-256 hash of N bits of data, the intermediate hash HASH_INT (stored in the registers H0-H7 431) of floor (N/512) blocks is computed (these blocks of data need not be stored for further use) and stored along with the remaining un-hashed (N mod 512) bits of data. When the next set of data needs to be hashed, these un-hashed bits are appended at the end of the new data, and the hash state H0-H7 is restored from HASH_INT from registers H0-H7 431.

This process is repeated until the final value hash has been computed. For example, the DTLS handshake involves hash (transcript) computations at each of a plurality of points in the handshake process. The hash value produced at each of the first five computations may be referred-to as an "intermediate" hash value (e.g., "HASH_INT"), and the final hash value may be referred to as the "final" hash value or final transcript.

The 64-byte FIFO register 434 is used to feed handshake bytes to the SHA2-256 hardware accelerator 430. Between handshake messages, the same 64-byte FIFO 434 stores the un-hashed bytes while the intermediate hash is preferably stored in registers 431 and/or the DTLS RAM 470. Moreover, in preferred embodiments, once a byte is fed to the SHA2-256 circuit 430, the system discards that byte (e.g., that byte is no longer stored in the SHA2-256 circuit or in memory 470). This approach reduces the total session transcript memory usage from several kilobytes down to only about 96 bytes.

A consequence of the foregoing is that there is no need to store all messages exchanged in a handshake, and in fact, each message may be discarded after it is used in the hash computation. This is because the SHA2-256 circuit 430 processes messages as they are sent or received, each time calculating an intermediate hash, which is stored in register 431. This approach reduces system cost, system footprint (e.g., on an integrated circuit implementation of the SHA2-256 circuit 430), manufacturing costs, and power consumption.

There are occasions when the system 300 uses the SHA2-256 circuit 430 for purposes other than computing the next (intermediate or final) hash value. For example, some embodiments use the SHA2-256 circuit 430 to perform part or all of a "secondary function," such as generating a message for sending to the server 130, and/or processing a message received from the server 130, to name but a few examples. Such use of the SHA2-256 circuit 430 avoids the need to have a separate circuit to perform part or all of the secondary function, thereby reducing system size and complexity.

However, as noted above, the SHA2-256 circuit 430 stores, in its registers, data produced by each hash computation. As such, after computing a hash value, the SHA2-256 circuit 430 may be said to be in a given state (a "hash state" or "hash circuit state"), such state defined by the content of its registers. Use of the SHA2-256 circuit 430 for a secondary purpose will change the data in those registers, and thereby destroy that given state of the SHA2-256 circuit, rendering the SHA2-256 circuit unable to pick-up where it left-off (prior to performing the secondary function) to produce a subsequent hash value.

To avoid this loss, and to enable the SHA2-256 circuit 430 to subsequently resume its session-hashing functionality, some embodiments save the state of the SHA2-256 circuit to memory 470, and after completion of the secondary function, use that state data to reconfigure the SHA2-256 circuit 430 to its previous given state. FIG. 4D is a flow chart for such an operation. Several examples of the process are illustrated in FIGS. 5A-5D and FIG. 6.

The flowchart of FIG. 4D, described below, illustrates a method of saving to memory SHA2-256 data that collectively represents a given state of the SHA2-256 circuit at a given time (a "hash state write"), and at a subsequent time reading that SHA2-256 data from memory (a "hash state read") and restoring the SHA2-256 circuit to the given state (a "hash state restore" or "hash circuit restore"). In preferred embodiments, the process of FIG. 4D is performed under control of the Session Hash circuit 454.

It should be noted that, for many protocols (e.g., DTLS) the steps of the protocol are known in advance, and are fixed in order (i.e., they are performed in a pre-set order, which order is not changed or directed as a result of a conditional event or interrupt). Some of those steps may implement secondary functions. Thus, places within the protocol at which the state of the SHA2-256 circuit 430 would be lost (e.g., when the SHA2-256 circuit 430 is used for a secondary function) can be predicted, and the following process implemented.

At step 481, the client 110 writes hash state data (e.g., the content of the registers 431, 432, and 434 of the SHA2-256 circuit 430) to the memory 470, and specifically to a segment 471 of the memory 470 prior to the using the SHA2-256 circuit for a secondary function. The DTLS controller 450 is configured to use segment 471 of the memory 470 only for hash state data so that the hash state data in segment 471 will not be overwritten by any other operation of the system 300. Such a write may be referred-do as a "hash state write."

Consequently, the SHA2-256 circuit 430 is made available to perform the secondary function, at step 482, without losing the ability of the SHA2-256 circuit 430 to later resume its computation of a session hash.

Then at step 483, after completion of the secondary function, the client 110 reads the previously-stored hash state data from the memory 470. Such a read may be referred-do as a "hash state read."

Subsequently, at step 484, the client 110 restores the previous state of the SHA2-256 circuit by writing that previously-stored hash state data back into the registers of the SHA2-256 circuit. Consequently, the SHA2-256 circuit 430 is configured to resume the session hash where it left off (prior to the hash state write, and performance of the secondary function).

As described above, it will be understood that the system 300 is configured to use the hashing circuit 430 to generate an intermediate hash value from a set of messages; and store hash state data from the hashing circuit 430 to the memory circuit 470. The system 300 can then use the hashing circuit 430 for a secondary purpose, which secondary purpose leaves the hashing circuit 430 in a second state (different from the state defined by the hash state data); and subsequently read the hash state data from the memory circuit 470. The system 300 can restore the hashing circuit 430 to the first state, so that the hashing circuit 430 is configured to generate a subsequent hash value (of a session hash) by operating on the intermediate hash value.

Turning now to ECC computations, the inventors estimate that ECC computations, such as elliptic curve Diffie-Hellman key exchange (ECDHE) and elliptic curve digital signature algorithm (ECDSA), account for over 99% of energy used in handshake operations. For example, known resource-constrained ECC implementations typically use projective coordinates to avoid modular inversion in the ECSM inner loop, at the cost of extra multiplications and a final expensive Fermat inversion.

Figure 4F:
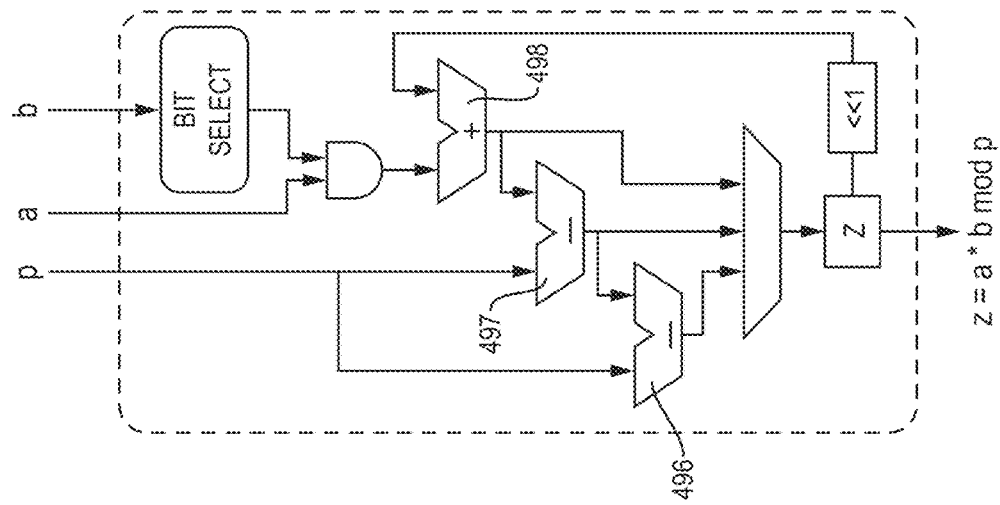
FIG. 4F schematically illustrates an embodiment of a modular multiplier circuit.
Figure 4E:
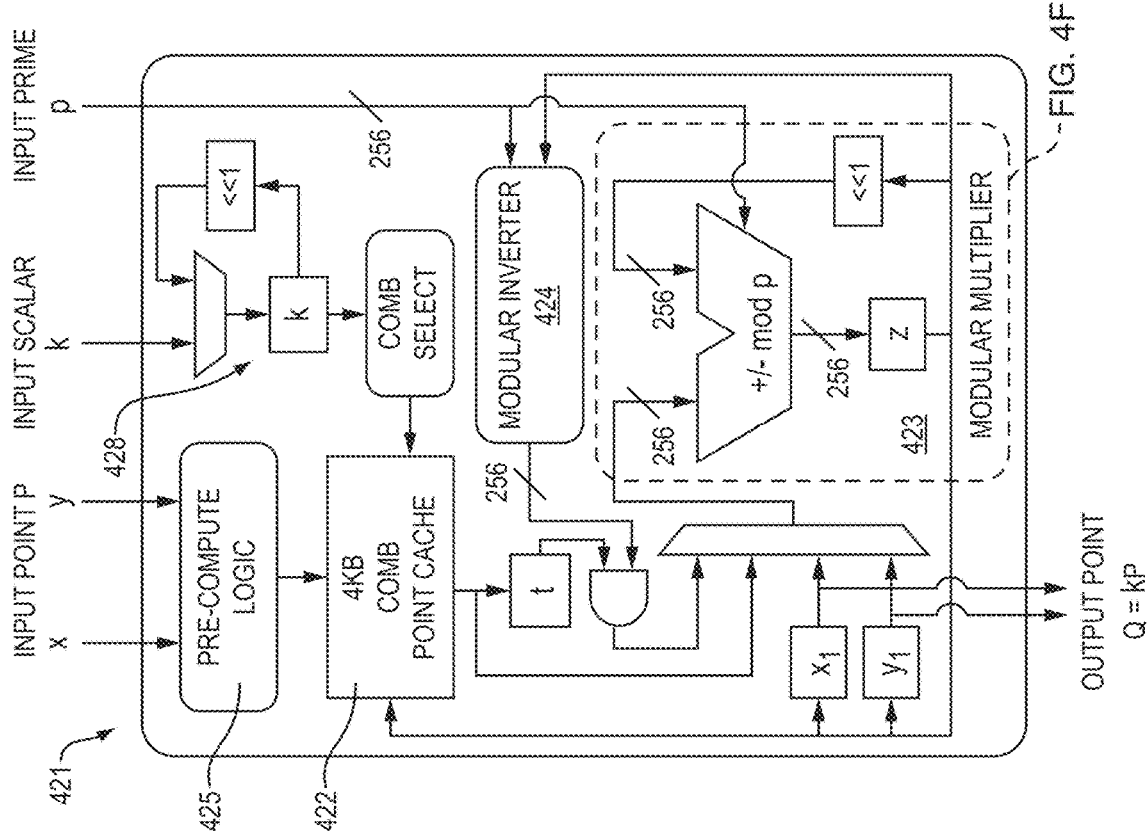
FIG. 4E schematically illustrates an embodiment of an ECC accelerator circuit.

FIG. 4E and FIG. 4F schematically illustrates and embodiment of a fixed-logic ECC accelerator circuit 421. In illustrative embodiments, the ECC accelerator 421 is more energy-efficient, and reduces the overhead of ECC computations as compared to known ECC implementations.

Elliptic curve cryptography (ECC) is used in DTLS for both key exchange and digital signature protocols.

The fundamental operations used in ECC 421 are point addition (R=P+Q), and point doubling (R=P+P). Repeated additions of a point P with itself is called "elliptic curve scalar multiplication" (ECSM). For any scalar k, the multiple kP is computed as a series of point doubling (DBL) and point addition (ADD) operations, which can essentially be decomposed into arithmetic in the finite field Fp. This makes efficient modular arithmetic integral to both software and hardware implementations of ECC. FIG. 4E and FIG. 4F describe an embodiment of an energy-efficient ECSM hardware circuit 421, which can be configured with prime p of variable length t (up to 256 bits) and curve parameters a and b. Given scalar k and point P (x; y), it generates Q=kP.

A pre-computation-based comb algorithm implemented in comb circuit 425 is used for elliptic curve scalar multiplication (ECSM), and a 4 KB cache 422 is configured to store pre-computed comb data for a plurality of points, including generator points and public keys, thus reducing ECSM energy by approximately 2.5× compared to a baseline implementation.

A 256-bit wide interleaved reduction-based modular multiplier 423 is implemented to support all Weierstrass and Montgomery curves over prime fields up to 256 bits, with higher bits of the data-path gated when working with smaller primes. The use of interleaved reduction allows illustrative embodiments to handle arbitrary primes without any special structure, enabling support for NIST, SEC and ANSI curves.

In order to support arbitrary prime fields without special structure, the modular multiplier 423 performs multiplication with interleaved modular reduction, which is essentially a loop of double-add-reduce steps. As schematically illustrated in FIG. 4F, three adders are used for this computation, one for addition and two for reduction. While most conventional ECC designs choose 16-bit or 32-bit data-paths for modular arithmetic, preferred embodiments disclosed herein use full 256-bit data-path adders for energy-efficiency, with higher bits of the data-path gated when working with smaller primes. The reduction uses conditional subtractions, all performed in the same cycle so that the modular multiplication is constant time and there is no potential timing side-channel. The same circuitry can be re-used for modular addition.

An illustrative embodiment implements a dedicated 31 k-gate modular inverter 424, allowing the use of affine coordinates, which saves 1.93× in ECSM energy by trading off the extra multiplications for cheaper Euclid inversions.

Furthermore, preferred embodiments implement a zero-less signed digit representation of the scalar k to prevent simple power analysis side-channel attacks on the ECSM. More specifically, a hardware implementation of elliptic curve scalar multiplication in illustrative embodiments (e.g., multiplier 423) uses the zero-less signed digit representation of the scalar to prevent such power analysis side-channel attacks. In this method, binary patterns of the form [0, 1] in the scalar are iteratively replaced by [1, −1] so that the scalar is free of "0" bits. This method is mathematically correct since $2^{\wedge}(k)=2^{\wedge}(k+1)-2^{\wedge}(k)$.

Following is an example of conversion of the scalar 9 from binary to zero-less signed digit form:

$$[1, 0, 0, 1] > \qquad [1, 0, 1, -1] > \qquad [1, 1, -1, -1]$$
$$= 8 + 0 + 0 + 1 = 9 \quad = 8 + 0 + 2 - 1 = 9 \quad = 8 + 4 - 2 - 1 = 9$$

However, signed representation using digits {−1, 0, +1} requires 2 bits per digit, unlike the traditional unsigned binary digits which require 1 bit per digit. Therefore, such signed representations effectively and undesirably double the storage requirements.

To address that concern, since the zero-less signed digit representation of the scalar does not have any "0" bits, each "−1" digit is replaced by "0" to bring back the register size to the usual. Preferred embodiments apply this technique to hardware (fixed-logic) implementations. However, conversion of a scalar from binary to zero-less signed digit form still would still involve the traditional iterative approach, requiring up to "t" iterations for a "t"-bit scalar.

Preferred embodiments disclose a new method and architecture to efficiently convert the binary scalar to zero-less signed digit form, where the digits "+1" and "−1" are represented by "1" and "0" respectively.

Let the "t"-bit scalar to be converted be $k=[k\_(t-1), k\_(t-2), \ldots, k\_1, 1]$, where the least significant bit $k\_0=1$ since k needs to be odd to have a valid zero-less signed digit representation. Then, we can prove that $[1, k\_(t-1), k\_(t-2), \ldots, k\_2, k\_1]$ is the correct zero-less signed digit form of k, where a "1" digit stands for "+1" and a "0" digit stands for "−1". The proof is shown below:

$$(1, k_{t-1}, \ldots, k_2, k_1) = 2^{t-1} + \underbrace{\frac{k-1}{2}}_{+1 \text{ bits of } (k_{t-1}, \ldots, k_1)} - \underbrace{\left(2^{t-1} - 1 - \frac{k-1}{2}\right)}_{+1 \text{ bits of } (\overline{k_{t-1}}, \ldots, \overline{k_1})} = k$$

Preferred embodiments of the ECC accelerator circuit 421 is are configured to convert an input scalar (K) in binary format from that binary format to zero-less signed digit format via a conversion circuit 428. Therefore, using the foregoing method and architecture, the scalar is converted from binary to zero-less signed digit using a simple shift operation instead of the traditional iterative approach.

Following is an example of conversion of the scalar 9 from binary to zero-less signed digit form:
[1, 0, 0, 1]>["1", "1", "0", "0"]=[1, 1, −1, −1]

Figure 4G:
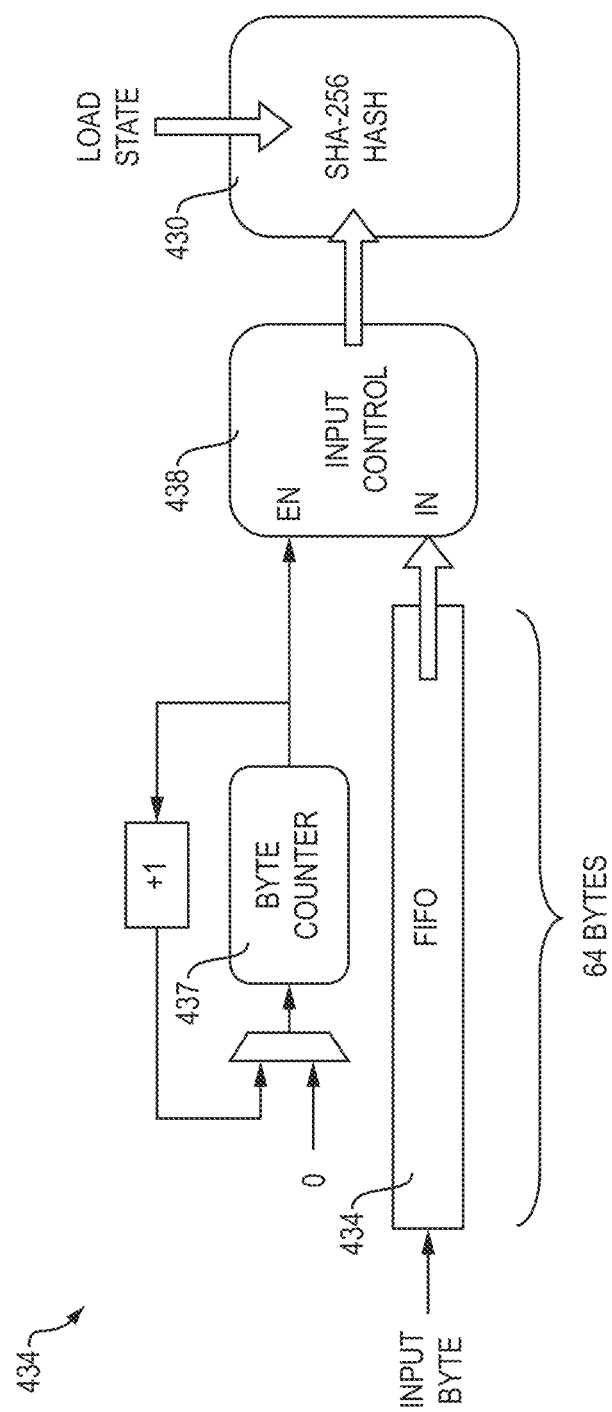
FIG. 4G schematically illustrates an embodiment of a session hash controller circuit.

FIG. 4G schematically illustrates an embodiment of a session hash controller circuit 434. In operation, the 64-byte (512-bit) FIFO register 434 takes in incoming message bytes (to be hashed), and a counter 437 keeps track of how many bytes are coming in. When the counter 437 reaches 64, that is, a full 512-bit block is available for hashing, the counter 437 enables the Hash circuit input controller 438 to forward the contents of the FIFO register 434 to the SHA2-256 hash circuit 430. In FIG. 4G, "Load State" indicates the restoration of the hash state during a hash circuit restore operation 484 (i.e., when resuming the session hash computation).

Figure 5A:
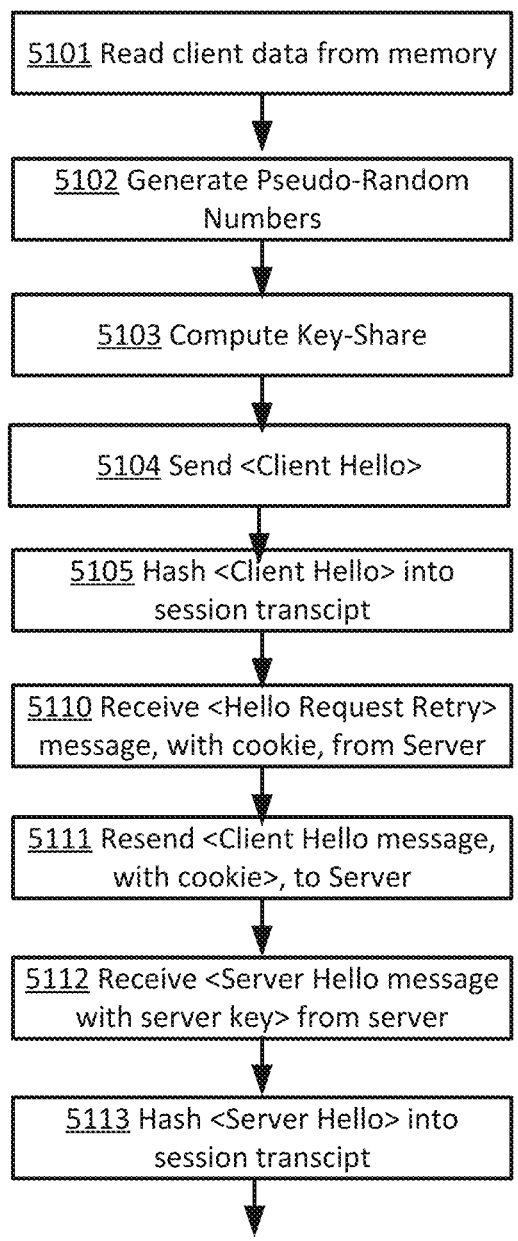
FIGS. 5A-5D together are a flow chart of an embodiment of a DTLS handshake between a client and a server.
Figure 5B:
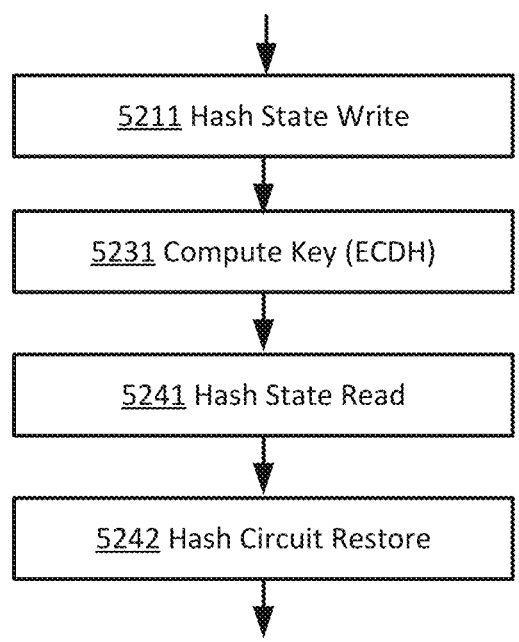
Figure 5C:
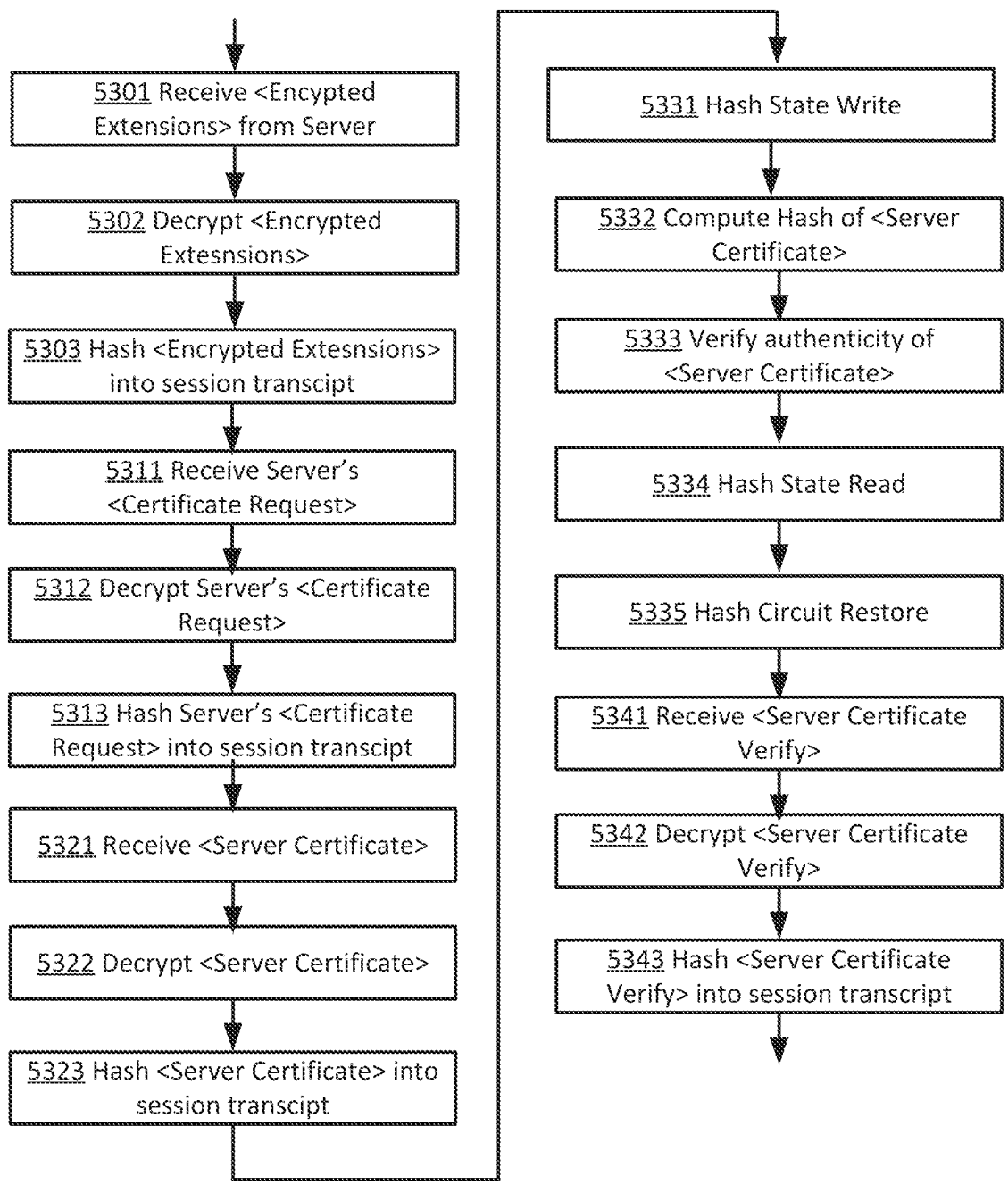
Figure 5D:
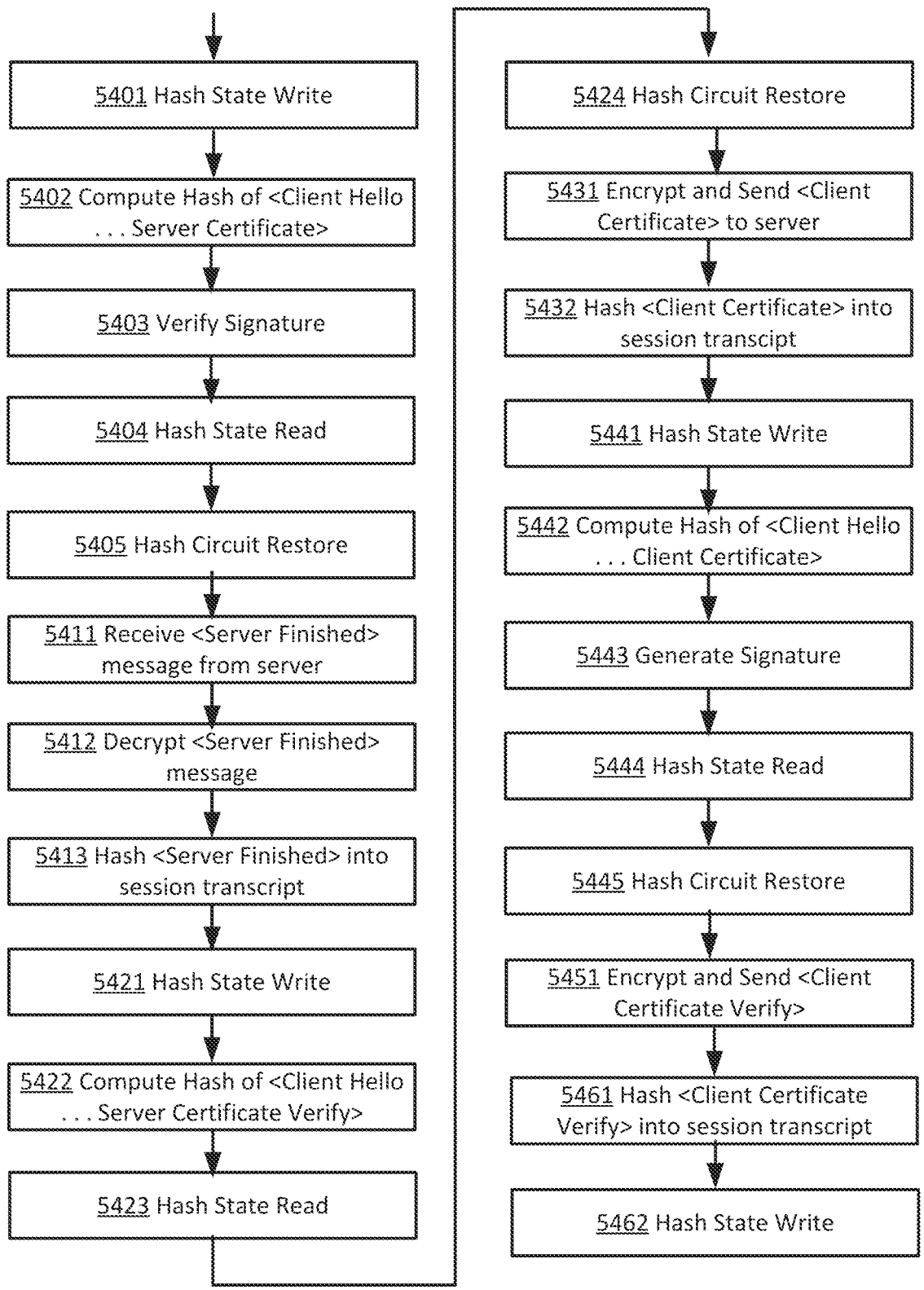
Figure 6:
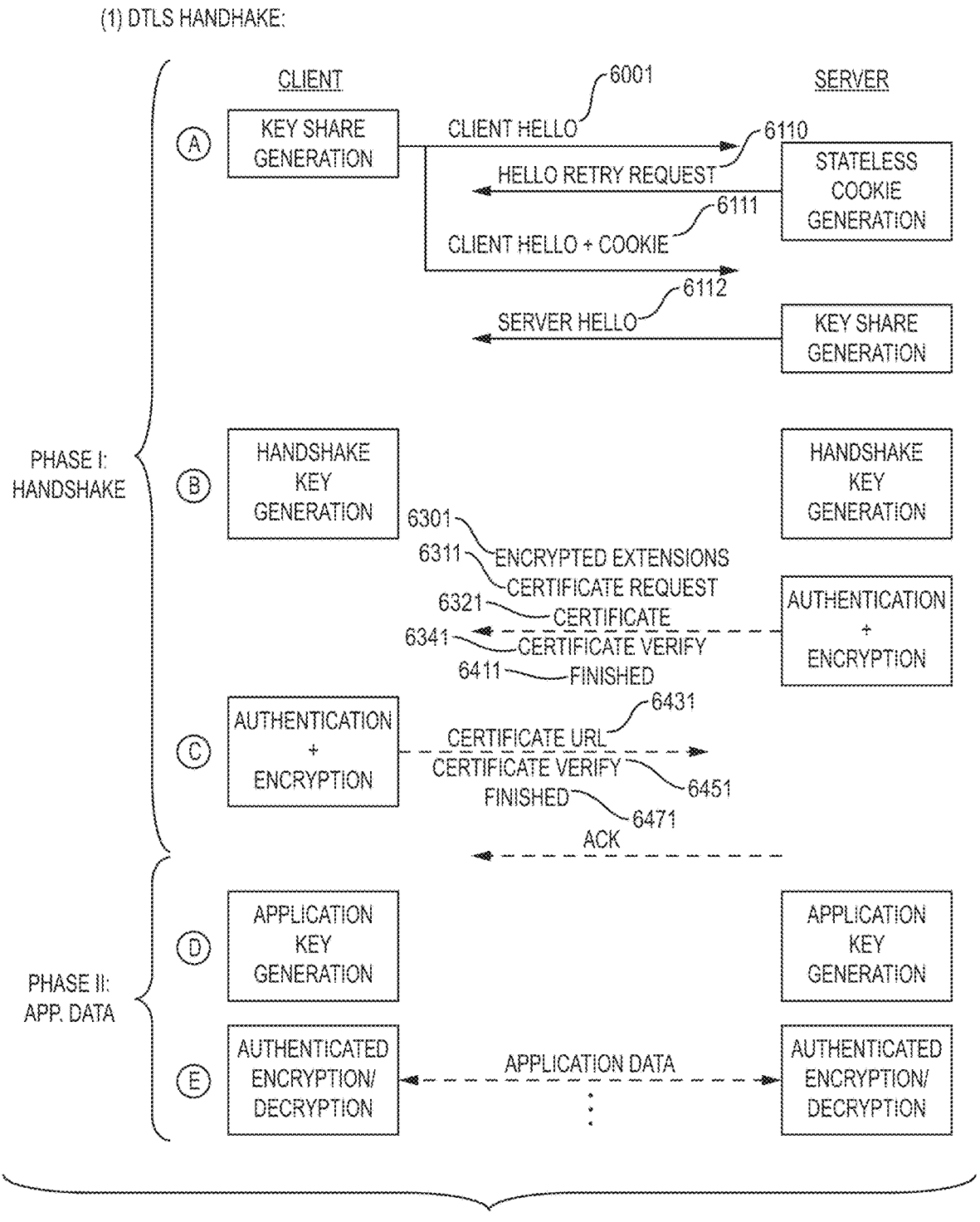
FIG. 6 schematically illustrates messages exchanged between a client and a server during a handshake.

FIG. 5 is a flow chart illustrating operation of a DTLS system at a client 110 executing a handshake with a server 130, and FIG. 6 schematically illustrates messages exchanged between a client and a server during a handshake.

At step 5101, the client 110, and more particularly the DTLS controller 450, reads client data (e.g., secret key, public key, certificate) from the memory 470, and particularly from memory partition 472. The client 110 uses the client data to configure circuits of the DTLS controller 400.

The client 110 also generates at least one pseudo-random number (step 5102) and a key-share (step 5103). In preferred embodiments, the client 110 computes the key-share using an Elliptic-curve Diffie-Hellman (ECDH) protocol.

At step 5104, the client 110 sends a <ClientHello> message 601 to the server 130.

At step 5105, the client uses the SHA2-256 circuit 430 to generate a first intermediate hash by hashing the <ClientHello> message 6001. The first intermediate hash begins a session transcript. As explained above, in preferred embodiments, the client 110 does not save messages sent by the client 110 to the server, such as the <ClientHello> message 6001, after using such a message to generate an intermediate (or final) hash, and instead discards or deletes such messages.

At step 5110, the client 110 receives from the server 130 a <HelloRequestRetry> message 6110. In response, the client 110 sends the <ClientHello> message 6001 and a client cookie 6111 at step 5111.

The client 110 then receives, from the server 130, a <ServerHello> 6112, along with a server key, at step 5112. In illustrative embodiments, the <ServerHello> message 6112 can contain the chosen protocol version, a random number, cipher suite and compression method from the choices offered by the client.

At step 5113, the client uses the SHA2-256 circuit 430 to generate a second intermediate hash by hashing the <ServerHello> message 6112 into the session transcript. The client 110 typically does not save a message received from the server 130, such as the <ServerHello> message 6112, after it uses such a message to generate an intermediate hash, and instead discards such messages.

The process continues in FIG. 5B. At step 5211, the client 110 performs a hash state write—i.e., it writes the content of the registers of the SHA2-256 circuit 430 to memory 470. The content of those registers can be retrieved from the memory 470 to restore the SHA2-256 circuit 430 to the state it was in prior to step 5211.

At step 5231, the client 110 generates a handshake key using the SHA2-256 circuit 430. In preferred embodiments, the client 110 computes the handshake key via an Elliptic-curve Diffie-Hellman (ECDH) protocol.

At step 5241, the client 110 performs a hash state read, i.e., it reads the previously-stored content of the registers of the SHA2-256 circuit 430 from memory 470, and at step 5242 the client 110 performs a hash circuit restore—i.e., it restores the SHA2-256 circuit 430 to its previous condition.

The process continues in FIG. 5C. At step 5301, the client 110 receives, from the server 130, an <Encrypted Extensions> message 6301, and at step 5302 the client 110 decrypts the <Encrypted Extensions> message 6301.

At step 5303, the client 110 uses the SHA2-256 circuit 430 to generate another intermediate hash by hashing the <Encrypted Extensions> message 6301 into the session transcript. The client 110 then discards the <Encrypted Extensions> message 6301. Moreover, it should be noted that the client 110 has not saved, and does not have access to, all of the previously-received messages (at this stage, <Client Hello> and <Server Hello>). Rather, the client 110 computes the hash using the most recently received message (at this stage, the <Encrypted Extensions> message 6301) (and any remaining bytes from previous messages that remain in the FIFO register 434) and data remaining in the SHA2-256 circuit 430 from previous computations of intermediate hashes of the session transcript.

At step 5311, the client 110 receives from the serve 130 the server's<CertificateRequest> message 6311, and at step 5312 the client 110 decrypts the <CertificateRequest> message 6311.

At step 5313, the client 110 uses the SHA2-256 circuit 430 to generate another intermediate hash by hashing the decrypted <CertificateRequest> message 6311 into the session transcript. The client 110 then discards the server's <CertificateRequest> message 6311.

At step 5321, the client 110 receives from the server 130 the server's<Server Certificate> 6321, and at step 5322, the client decrypts the <Server Certificate> 6321.

At step 5323, the client 110 uses the SHA2-256 circuit 430 to generate another intermediate hash by hashing the decrypted <Server Certificate> 6321 into the session transcript.

At step 5331, the server 110 performs a hash state write. Then, at step 5332, the client 110 computes a hash of the <Server Certificate> 6321, and at step 5333, the client 110 verifies the authenticity of the <Server Certificate> 6321. The client 110 then discards the server's<Server Certificate> 6321.

The client 110 then performs a hash state read, at step 5334, and a hash circuit restore at step 5335.

The client 110 then receives a <Server Certificate Verify> message 6341, at step 5341, and decrypts the <Server Certificate Verify> message 6341 at step 5342.

At step 5343, the client 110 uses the SHA2-256 circuit 430 to generate another intermediate hash by hashing the decrypted <Server Certificate Verify> message 6341 into the session transcript, and discards the <Server Certificate Verify> message 6341.

The process continues in FIG. 5D. At step 5401, the client 110 performs a hash state write.

The client 110 uses the SHA2-256 circuit 430 to compute, at step 5402, a hash of the message from <ClientHello> 6001 through <ServerCertificate> 6321. At step 5303, the client 110 verifies the signature.

At step 5404, the client 110 performs a hash state read, and at step 5405 performs a hash circuit restore.

At step 5411, the client 110 receives, from the server 130, a <ServerFinished> message 6411. At step 5412, the client 110 decrypts the <ServerFinished> message 6411, and at step 5413 the client 110 hashes the <ServerFinished> message 6411 into the session transcript.

At step 5421, the client 110 performs a hash state write. At step 5422, the client computes a hash of the <ClientHello> message 6001 through the <Server Certificate Verify> message 6341.

At step 5423, the client 110 performs a hash state read, and at step 5434 the client 110 performs a hash circuit restore.

At step 5431, the client 110 encrypts a <Client Certificate> 6431 and sends the encrypted <Client Certificate> 6431 to the server 130.

At step 5432, the client 110 hashes the <Client Certificate> 6431 into the session transcript.

At step 5441, the client 110 performs another hash state write.

At step 5442, the client 110 computes a hash of the <ClientHello> message 6001 through the <Client Certificate> 6431.

At step 5443, the client 110 generates a Signature. At step 5444, the client 110 performs a hash state read, and at step 5445 the client 110 performs a hash circuit restore.

At step 5451, the client 110 encrypts and sends to the server 130 a <Client Certificate Verify> message 6451.

At step 5461, the client 110 hashes the <Client Certificate Verify> message 6451 into the session transcript. At this point, the session transcript is the final session transcript.

At step 5462, the client 110 performs another hash state write.

At step 5471, the client 110 sends to the sever 130 a <Client Finished> message 6471.

At this point, the handshake is complete, and the client 110 and server 130 proceed (step 220 of FIG. 2; "Phase II: App. Data" in FIG. 6) to communicate over the channel established by the handshake process.

As explained above, the client 110 uses the SHA2-256 circuit 430 for multiple purposes, sometimes to compute an intermediate hash or final hash of a session transcript, and at other points to perform secondary functions (some of which may include generating a hash value that is not an intermediate hash or final hash of a session transcript). For example, in addition to its use in creating various messages sent by the client 110 to the server 130, and processing messages received by the client 110 from the server 130, at several points in the handshake process the SHA2-256 circuit 430 also creates a hash of all messages sent by the client 110 to the server 130, and all messages received by the client 110 from the server 130.

Although illustrative embodiments herein are described in terms of a DTLS protocol using a SHA2-256 hashing algorithm and circuit, the concepts described herein are not limited to application in a DTLS protocol using a SHA2-256 hashing algorithm and circuit. For example, the hash state write, hash state read, and hash circuit restore operation may be used with other hash algorithms and circuits that compute (or are configured to compute) an intermediate hash value and/or final hash value in which a previously-computed intermediate hash value defines the state of a session hash computation sufficiently that the previously-computed intermediate hash value can be used as input to a subsequent computation of a subsequent intermediate hash value and/or final hash value without requiring, as input to such subsequent computation, copies of saved messages that were previously consumed by a previous hash computation. Systems and methods employing such a hashing function and/or circuit may perform part of a communications protocol, generate an intermediate session hash transcript using a given hashing circuit; perform a hash state write; perform a secondary function using a given hashing circuit; perform a hash state read and a hash circuit restore, and subsequently perform a subsequent intermediate or final session has computation using the same using a given hashing circuit.

A listing of certain reference numbers is presented below.
100: Communications network;
110: Client;
120: Cloud;
130: Server;
140: Computer;
150: Man in the middle node;
300: System;
310: Microprocessor;
320: SD Controller;
321: Off-chip program memory;
400: DTLS engine;
401: Multiplexer;
402: Temporary Register;
420: Cyrptography accelerator;
421: Prime Curve circuit;
422: Comb Point Cache;
423: Modular Multiplier;
424: Modular Inverter;
425: Pre-Compute Logic;
427: AES-128 GCM circuit;
428: Binary format to zero-less signed digit format conversion circuit;
430: SHA2-256 circuit;
431: H registers;
432: A registers (or a-h registers);
433: 512-bit message block;
434: FIFO register;
435: SHA-2 Round Function circuit;
436: XOR circuit;
437: Byte counter;
438: Hash circuit input controller;
450: DTLS controller;
451: DTLS State Machine;
452: HMAC-DRBG;
453: X.509 Parser;
454: Session Hash;
455: Re-Tx Timer;
470: DTLS RAM;
471: Hash state memory;
472: DTLS Configuration memory;
473: Accel. Configuration memory;
491: $\Sigma_0$ circuit;
492: $\Sigma_1$ circuit;
493: Maj circuit;
494: Ch circuit;
495: 32-bit addition modulo $2^{32}$ circuit;
496: Adder;
497: Adder;
498: Adder.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A system for providing secure communications between a plurality of nodes on a network, comprising:
  a plurality of subsystems configured to:
  (1) execute a handshake process between a first node and a second node, to establish a confidential communication channel therebetween; and
  (2) manage transmissions of encrypted data between the first node and the second node,
  wherein the encrypted data is transmitted via the confidential communication channel using a communication protocol.

P2. The system of P1, wherein the plurality of subsystems includes:
a processor; and
a protocol engine configured to manage the execution of the communication protocol for the transmission of the encrypted data.

P3. The system of P2, wherein the protocol engine includes a cryptographic accelerator and a protocol controller.

P4. The system of P3, wherein the cryptographic accelerator is an energy-efficient elliptic curve cryptographic (ECC) accelerator.

P5. The system of P4, wherein, during the execution of the handshake process, the ECC accelerator is configured to execute one or more ECC computations, including at least one of an elliptic curve Diffie-Hellman key exchange (ECDHE) and an elliptic curve digital signature algorithm (ECDSA).

P6. The system of P4, wherein the ECC accelerator is configured to execute a pre-computation-based comb algorithm for elliptic curve scalar multiplication (ECSM).

P7. The system of P4, wherein the ECC accelerator includes:
a cache configured to store pre-computed comb data associated with the pre-computation-based comb algorithm;
a modular multiplier; and
a modular inverter.

P8. The system of P3, wherein the communication protocol is a datagram transport layer security (DTLS) protocol.

P9. The system of P8, wherein the one or more subsystem are configured to execute software to enable at least part of the transmission of the encrypted data between the first node and the second node using the communication protocol.

P10. The system of P9, wherein the transmission of the encrypted data is performed using the communication protocol executed in one of a plurality of resource utilization configurations including:
(1) a software only configuration;
(2) a software and hardware configuration; and
(3) a hardware only configuration.

P11. The system of P10, wherein, in the software and hardware configuration, cryptographic acceleration is executed using hardware including the protocol engine.

P12. The system of P3, wherein the protocol controller is configured to perform one or more of packet framing, computation of session transcript, parsing and validation of digital certificates, key-scheduling, and pseudo-random number generation.

P13. The system of P3, wherein the cryptographic accelerator is configured as described and illustrated within the documents submitted herewith.

P14. The system of P3, wherein the cryptographic accelerator is configured to operate in a low-power manner in view of the techniques and configurations described and illustrated within the documents submitted herewith.

P15. The system of P1, wherein the system is optimized to minimize energy consumption, reduce memory required to store code, and execute a plurality of security application.

P16. The system of P15, wherein the plurality of security applications includes Elliptic Curve Menezes-Qu-Vanstone (ECMQV), Schnorr Prover, and Merkle Hashing.

P17. The system of P1, wherein the communication protocol is executed in a hardware only configuration.

P18. The system of P1, wherein the communication protocol is executed in a hardware and software configuration.

Various embodiments of the present disclosure may be implemented at least in part in any conventional computer programming language. For example, some embodiments may be implemented in a procedural programming language (e.g., "C"), or in an object oriented programming language (e.g., "C++"). Other embodiments of the present disclosure may be implemented as preprogrammed hardware elements (e.g., application specific integrated circuits, FPGAs, and digital signal processors), or other related components.

In an alternative embodiment, the disclosed systems and methods may be implemented as a computer program product for use with a computer system. Such implementation may include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the present disclosure may be implemented as a combination of both software (e.g., a computer program product) and hardware. Still other embodiments of the present disclosure are implemented as entirely hardware, or entirely software.

The embodiments of the present disclosure described above are intended to be merely exemplary; numerous variations and modifications will be apparent to those skilled in the art. Further, one skilled in the art will appreciate further features and advantages of the disclosure based on the above-described embodiments. All such variations, modifications and features are intended to be within the scope of the present disclosure as defined in any appended claims.

What is claimed is:

1. A method of executing a handshake between a client and a server, the method comprising:
generating, at the client, a client hello message, and sending the client hello message to the server;
creating a first intermediate hash of the client hello message using a SHA2-256 hash circuit;
storing the first intermediate hash in the SHA2-256 hash circuit;
discarding the client hello message at the client;
receiving, at the client, a server hello message from the server; and
using the SHA2-256 circuit, after discarding the client hello message at the client, to create a second intermediate hash from the first intermediate hash and the server hello message.

2. The method of claim 1, further comprising, after using the SHA2-256 circuit to create a second intermediate hash and before using the SHA2-256 circuit to generate a subsequent hash, discarding the server hello message at the client.

3. The method of claim 1, further comprising, after creating the second intermediate hash, when the SHA2-256 circuit is in a given state:
performing a hash state write to a memory, the hash state write storing, in the memory, hash state data defining the given state of the SHA2-256 circuit; and subsequently
performing a secondary function using the SHA2-256 circuit, the secondary function being a function other than the hash function and leaving the SHA2-256 circuit in a second state different from the given state; and subsequently
performing a hash state read from the memory, by which the hash state read retrieves, from the memory, the hash state data; and subsequently
restoring the SHA2-256 circuit to the given state using the hash state data.

4. The method of claim 3, wherein the secondary function using the SHA2-256 circuit comprises generating a client handshake key.

5. The method of claim 3, wherein the secondary function using the SHA2-256 circuit comprises verifying a server certificate received from the server.

6. A computer system, comprising:
a processor; and
a memory storing instructions that when executed by the processor cause the computer system to execute a handshake between a client and a server, comprising:
generating, at the client, a client hello message, and sending the client hello message to the server;
creating a first intermediate hash of the client hello message using a SHA2-256 hash circuit;
storing the first intermediate hash in the SHA2-256 hash circuit;
discarding the client hello message at the client;
receiving, at the client, a server hello message from the server; and
using the SHA2-256 circuit, after discarding the client hello message at the client, to create a second intermediate hash from the first intermediate hash and the server hello message.

7. The computer system of claim 6, wherein the instructions, when executed, comprise:
after using the SHA2-256 circuit to create a second intermediate hash and before using the SHA2-256 circuit to generate a subsequent hash, discarding the server hello message at the client.

8. The computer system of claim 6, wherein the instructions, when executed, comprise:
after creating the second intermediate hash, when the SHA2-256 circuit is in a given state:
performing a hash state write to a memory, the hash state write storing, in the memory, hash state data defining the given state of the SHA2-256 circuit; and subsequently
performing a secondary function using the SHA2-256 circuit, the secondary function being a function other than the hash function and leaving the SHA2-256 circuit in a second state different from the given state; and subsequently
performing a hash state read from the memory, by which the hash state read retrieves, from the memory, the hash state data; and subsequently
restoring the SHA2-256 circuit to the given state using the hash state data.

9. The computer system of claim 8, wherein the secondary function using the SHA2-256circuit comprises generating a client handshake key.

10. The computer system of claim 8, wherein the secondary function using the SHA2-256circuit comprises verifying a server certificate received from the server.

11. The computer system of claim 6, further comprising:
a protocol engine configured to execute a handshake between a client and a server.

12. The computer system of claim 11, wherein the protocol engine comprises:
a cryptographic accelerator; and
a protocol controller.

13. The computer system of claim 12, wherein the cryptographic accelerator comprises an energy-efficient elliptic curve cryptographic accelerator.

14. The computer system of claim 13, wherein the energy-efficient elliptic curve cryptographic accelerator is configured to execute one or more elliptic curve cryptographic computations.

15. The computer system of claim 14, wherein the one or more elliptic curve cryptographic computations comprises at least one of an elliptic curve Diffie-Hellman key exchange or an elliptic curve digital signature algorithm.

16. The computer system of claim 14, wherein the elliptic curve cryptographic accelerator is configured to execute a pre-computation-based comb algorithm for elliptic curve scaler multiplication.

17. The computer system of claim 16, wherein the elliptic curve cryptographic accelerator comprises:
a memory cache configured to store pre-computed comb data associated with the pre- computation-based comb algorithm;
a modular multiplier; and
a modular inverter.

18. The computer system of claim 11, wherein the protocol engine is further configured to manage a datagram transport layer security protocol.

19. A non-transient computer readable medium storing instructions that, when executed by a computer system having a processor and a memory, cause the computer system to perform a method of executing a handshake between a client and a server, the method comprising:
generating, at the client, a client hello message, and sending the client hello message to the server;
creating a first intermediate hash of the client hello message using a SHA2-256 hash circuit;
storing the first intermediate hash in the SHA2-256 hash circuit;
discarding the client hello message at the client;
receiving, at the client, a server hello message from the server; and
using the SHA2-256 circuit, after discarding the client hello message at the client, to create a second intermediate hash from the first intermediate hash and the server hello message.

20. The non-transient computer readable medium of claim 19, wherein the method further comprises:
after using the SHA2-256 circuit to create a second intermediate hash and before using the SHA2-256 circuit to generate a subsequent hash, discarding the server hello message at the client.

21. The non-transient computer readable medium of claim 19, wherein the method further comprises:
after creating the second intermediate hash, when the SHA2-256 circuit is in a given state:
performing a hash state write to a memory, the hash state write storing, in the memory, hash state data defining the given state of the SHA2-256 circuit; and subsequently
performing a secondary function using the SHA2-256 circuit, the secondary function being a function other than the hash function and leaving the SHA2-256 circuit in a second state different from the given state; and subsequently
performing a hash state read from the memory, by which the hash state read retrieves, from the memory, the hash state data; and subsequently
restoring the SHA2-256 circuit to the given state using the hash state data.

22. The non-transient computer readable medium of claim 21, wherein the secondary function using the SHA2-256 circuit comprises generating a client handshake key.

23. The non-transient computer readable medium of claim 21, wherein the secondary function using the SHA2-256 circuit comprises verifying a server certificate received from the server.

* * * * *